United States Patent [19]

Haaser

[11] Patent Number: 4,700,827
[45] Date of Patent: Oct. 20, 1987

[54] VIBRATORY FEEDER ARRANGEMENT

[75] Inventor: Michael J. Haaser, Baltimore, Md.

[73] Assignee: Advanced Manufacturing Systems, Incorporated, Sparks, Md.

[21] Appl. No.: 626,774

[22] Filed: Jul. 2, 1984

[51] Int. Cl.$^4$ .............................................. B65G 27/00
[52] U.S. Cl. .................................. 198/771; 198/860.5
[58] Field of Search ............... 198/771, 755, 752, 750, 198/472, 345, 861, 860.3, 860.5

[56] References Cited

U.S. PATENT DOCUMENTS

| 2,157,339 | 5/1939 | Jeffery et al. | 198/771 |
| 3,583,171 | 6/1971 | Flynn | 198/860.5 X |
| 4,050,572 | 9/1977 | Armstrong | 198/771 X |

Primary Examiner—Robert J. Spar
Assistant Examiner—D. Glenn Dayoan
Attorney, Agent, or Firm—Reginald F. Pippin, Jr.

[57] ABSTRACT

A vibratory feeder arrangement includes a top segment removably connected to a bottom feed segment through a quick-release hinge arrangement, in which the hinge is freely movable when the top segment is disposed at angular positions away from its closed position, but which hinge has levered zero lash in the closed position of the top segment, with a suitable quick-release locking or clamping device for locking the top segment in effectively closed position. The arrangement also provides for levered zero lash between interengaging parts-guiding or retainer elements secured to the hinged bottom and top segments. A rigid zero-lash vibratory feeder is effected which enables an improved life span and less maintenance under the severe vibration encountered with vibratory feeders.

51 Claims, 14 Drawing Figures

VIBRATORY FEEDER ARRANGEMENT

This invention relates to vibratory feeders and more particularly to a vibratory feeder having a hinged top segment with zero hinge lash when the top segment is secured in its normal closed position.

Vibratory feeders are well known as enabling transfer of parts or items of various sizes and configurations through suitable vibratory action of a vibrated feeding surface. It is also well known to provide a removable top which is conventionally rigidly secured to a bottom feed member by securing bolts or screws to form a desired feed path bounded by guide or retainer surface means on the bottom feed member and the removable top. Removable top arrangements are highly desirable in order to permit ease of removal of defective parts which may cause a feed jam in the conveyor, or to otherwise free a feed jam, or to repair or replace defective parts of the feeder. However, as previously noted, such removable tops have conventionally been rigidly secured in place through such means as bolts and nuts, or screws, in order to provide a sufficiently rigid connection between the top and bottom of the feeder assembly to enable the connections therebetween to withstand the vibrations which are imparted to the feeder, and which will quickly cause impact damage and effective destruction at any loose connection, i.e., a connection having lash therein.

While these bolt-secured or screw-secured removable top vibratory feeder arrangements do permit disassembly and removal of the top from the bottom feeder section for needed servicing, it would be highly more desirable to employ a releasably closed hinged top. However, to my knowledge, all prior attempts to utilize a vibratory feeder with a hinged top have been unsatisfactory due to the inherent play or lash found in conventional hinge arrangements, with the undesirable result that the inherent continued harsh vibratory feed movement would cause the hinge to fail.

It is a major object and feature of the present invention to provide a vibratory feeder arrangement incorporating a hinged top section with zero lash in the hinge in the closed position of the top section.

Still another object and feature of the invention is to provide a vibratory feeder having a hinged top section with levered zero lash at the hinge joint or pivot when the top section is in its closed position.

It is another object and feature of the present invention to provide a vibratory feeder arrangement incorporating a hinged top section with zero lash in the hinge in the closed position of the top section, but which hinge enables easy free pivotal movement of the top section toward and away from the closed position of the top section.

It is a further object and feature to provide a vibratory feeder arrangement incorporating a removable hinged top section with zero lash in the hinge in the closed position and the top section, and which hinge enables quick and easy full removal and replacement of the top section.

Still a further object and feature is to provide a vibratory feeder arrangement with a hinged top having a hinge on one side of the feeder arrangement and top lock-down means at the opposite side of the feeder arrangement, and which hinge has zero lash at the hinge pivot in the closed position of the top, with one or more parts-guiding members disposed at laterally spaced positions between the hinge and top lock-down means, and with at least one of which parts guiding members forming a stack-up interference fit between the top and the bottom sections of the feeder when the top section is in its normal closed position and thereby assuring a zero lash condition at the hinge pivot as well as providing zero-lash stack-up mating between the top and bottom sections at the zone or zones of stack-up interference fit effected by said one or more interfering parts guiding members.

Still another object and feature is the provision of a vibratory feeder arrangement having a zero-lash hinged top section which is quickly and easily releasably disconnectible, removable and replaceable at the hinge while still affording zero lash at the hinge in the normal closed position of the hinged top.

A further object and feature is the provision of a vibratory feeder arrangement having a hinged top with a quick-release hinge which has zero lash in the normal closed position of the top, and which top is resiliently closed and held in its normal closed position by a manually operable quick-release over-center clamp or latch.

Still another object and feature is the provision of a vibratory linear feeder arrangement which may be formed of replaceable feeder sections which have hinged top segments with zero lash in the respective hinges when the top segments of the respective feeder sections are in their normal closed positions with their respective bottom segments.

Still a further object and feature is the provision of a vibratory feeder arrangement which may have one or more replaceable feeder sections, and in which a replaceable feeder section has a hinged top segment which has levered zero lash in the hinge in the normal closed position of the top while also being quickly and easily disconnectible and replaceable by snap-off removal and snap-on replacement at the hinge connection between the hinged top and its respective bottom.

Still further objects and attendant advantages of the invention will be apparent from a reading of the following detailed description of several embodiments of the invention taken in conjunction with the accompanying drawings, wherein.

Figure 1:
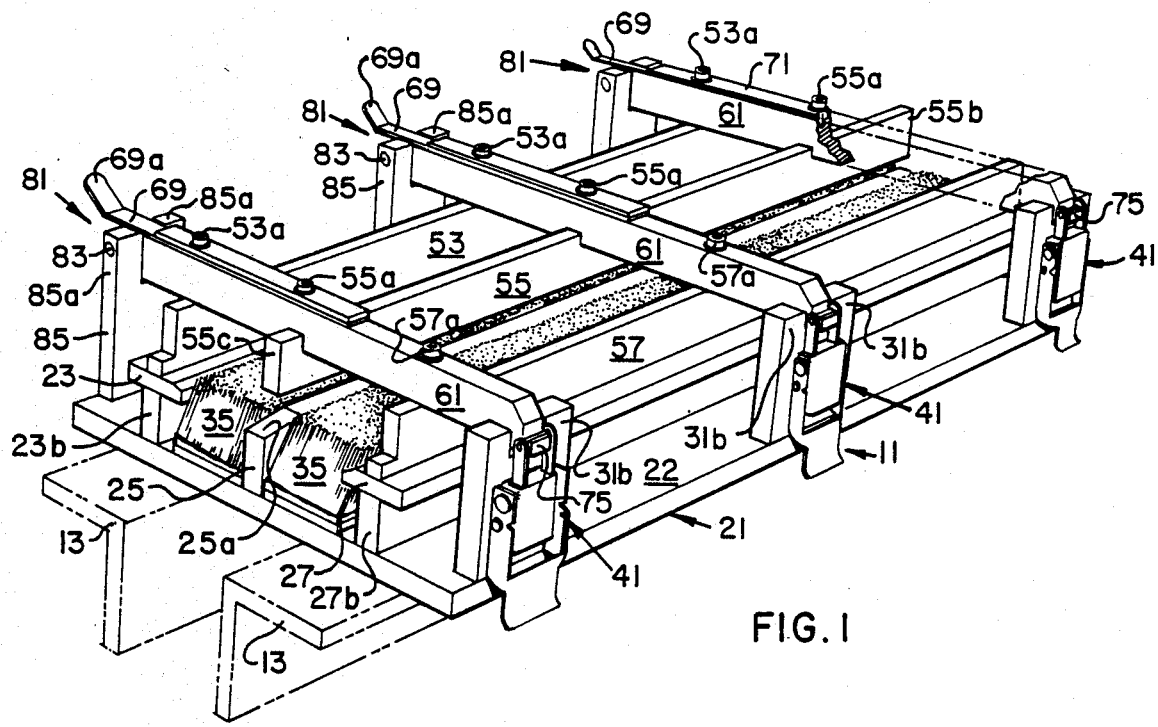
FIG. 1 is a perspective view of a linear feeder arrangement according to the invention and shown in releasably locked closed position.

Referring now in detail to the Figures of the Drawings, a preferred embodiment of the invention is illustrated in FIGS. 1–4, 7A and 7B, as applied to vibratory linear feeders. As shown schematically in FIG. 4, the invention is embodied in a plurality of modular feeder segments 11, each of which may be of a desired length to accommodate the desired total guided feed path FP for parts P, which parts P may suitably be flat metal blanks of any desired shape or size, or other parts of different shape and construction as may be desired to be fed from one location to another.

The feeder segments 11 are each suitably removable secured, as by bolts and nuts 12, to a pair of feed rails 13 carried by a plurality of spaced suitably angled spring supports 15 which may be of conventional or other desired construction, each of which spring supports 15 is retained between upper and lower spring blocks 17a, 17b, and with the lower spring blocks 17b being mounted on a suitable support base. A conventional vibrator 20, such as an eccentric drive assembly, is connected to the feed rails 13 and applies vibratory action normal to the longitudinal flat spring supports 15 to effect longitudinally oscillating vibratory feed action by the feeder sections 11 in the form of a vibratory lift and catch action to thereby effectively feed the parts P along the feed path FP formed by and through the sequential feeder sections 11. As is well known, the feed rate may be suitably adjusted by selection of a suitable combination of spring feed angle, vibration rate and vibration amplitude.

Figure 2:
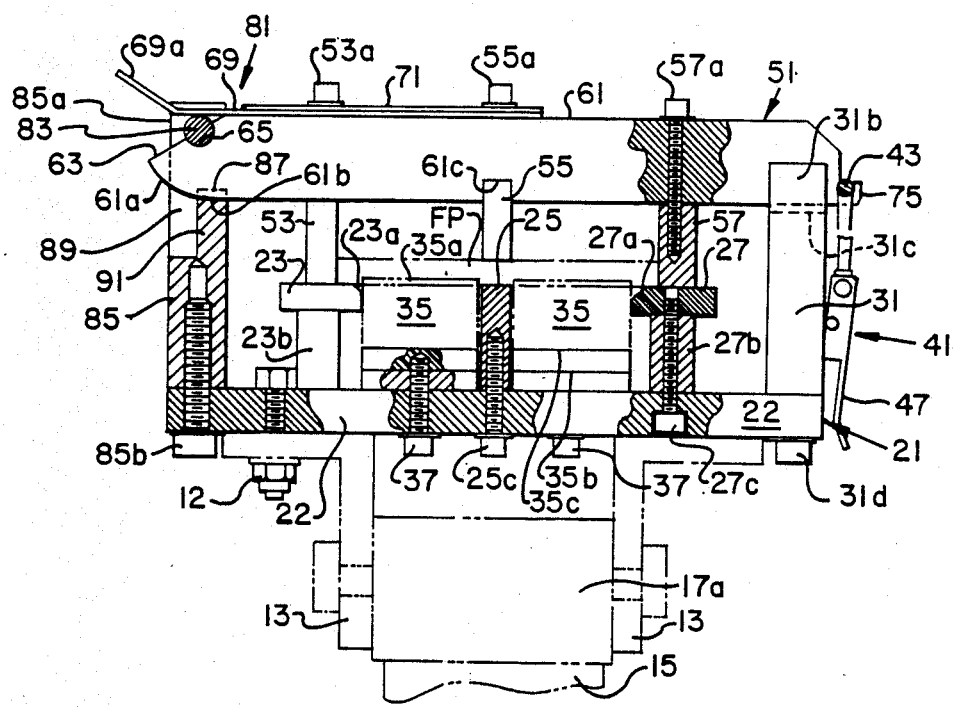
FIG. 2 is an end view, in partial section of the linear feeder arrangement of FIG. 1, and schematically illustrating a conventional form of flexible spring support therefor in phantom outline.
Figure 3:
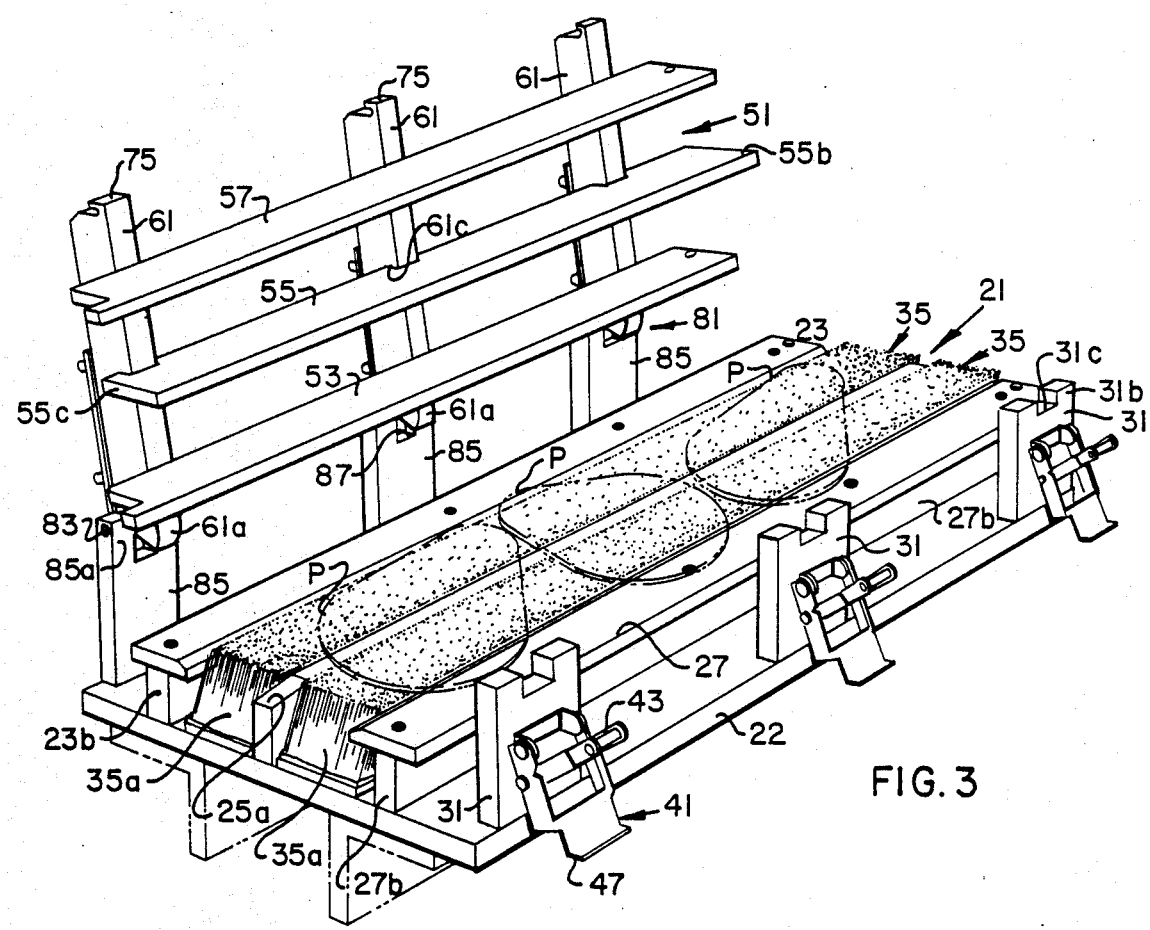
FIG. 3 is a perspective view of the vibratory feeder arrangement of FIG. 1, showing the hinged top in released and opened position, preparatory to servicing as may be desired and/or removal and replacement of the hinged top.
Figure 7A:
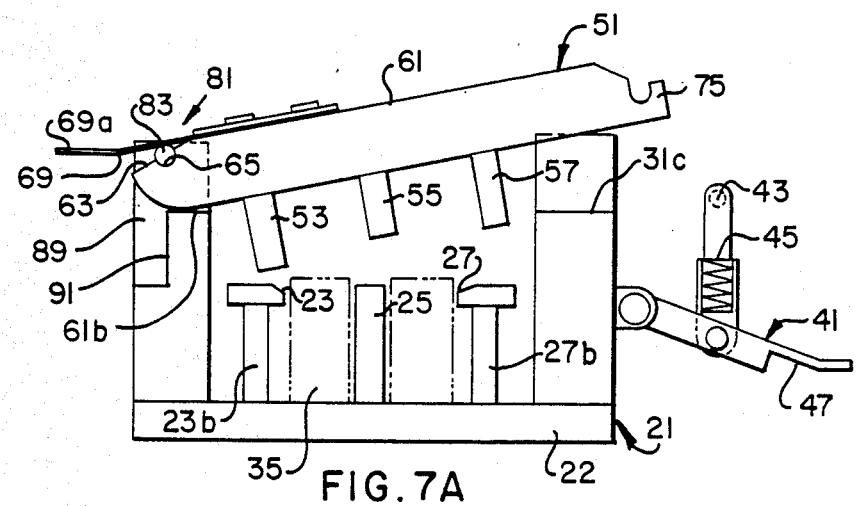
FIGS. 7A, 8A and 9A are end view schematic representations of hinged top and bottom feeder sections incorporating various zero-lash hinge embodiments according to the invention, each being shown in a partially open condition of the top segment preparatory to being releasably locked closed.
Figure 7B:
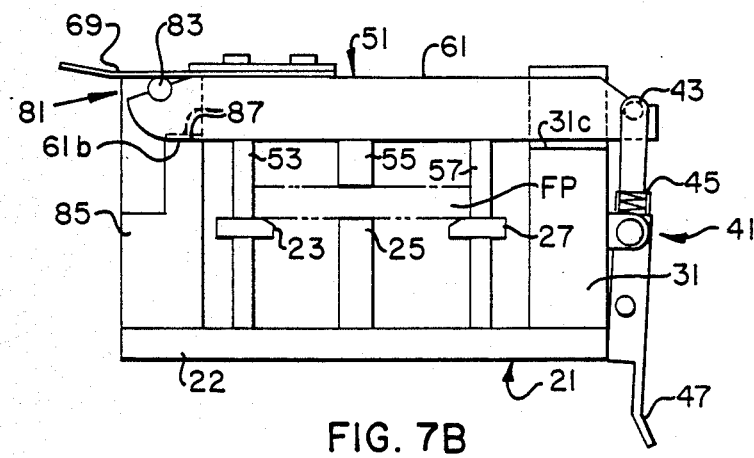
FIGS. 7B, 8B and 9B are views of the respective hinge arrangements of FIGS. 7A, 8A and 9A, showing the arrangements with their top segments in releasably locked closed position, and with the illustration of the brushes being omitted for clarity of illustration of the general cross sectional configuration of the feed paths formed thereby.

A preferred embodiment of a removable linear feeder section 11 is illustrated in detail in FIGS. 1–3 and schematically in FIGS. 7A and 7B. The linear feeder section 11 has a bottom segment 21 and a quick-release removable hinged top segment 51, with multiple hinges 81 each forming a zero lash hinge connection in the closed position of the top segment 51 with the bottom segment 21, as will be subsequently further described in more detail.

The bottom segment 21 includes a base plate 22 to which are secured longitudinally spaced hinge blocks 85 and front securing blocks 31, all formed of suitable material, preferably metal, such as aluminum, for hingedly pivotally mounting and releasably securing the hinged top segment 51.

The guided feed path FP for parts P to be fed is formed by inner and outer bottom retainers 23, 27 and middle bottom retainer 25 with forwardly angled brushes therebetween (all rigidly secured to the base plate 22, and which together with hinge blocks 85 and securing blocks 31 generally form the bottom segment 21), and inner and outer side retainers 53, 57 and top retainer 55 (which are secured to longitudinally spaced hinged top support bars 61, and which together generally form the hinged top segment 51 of the feeder section 11.)

Hinge blocks 85 and securing blocks 31 are suitably rigidly secured to the base plate 22 at the inner and outer edge zones thereof, by securing screws 85b and 31d respectively, while inner and outer bottom retainers 23 and 27 are secured together with respective stand-off bars 23b and 27b, to base plate 22 through the medium of securing screws, one of which is illustratively shown at 27c.

The forwardly angled brushes 35 extend along the length of the zone between the middle bottom retainer 25 and the inner and outer bottom retainers 23, 27, with the free upper bristle end surface extending slightly above, e.g., approximately 1/32 to 1/16 inch or the like as desired or appropriate for given parts P size, weight and other characteristics, to afford both aid in vibratory forward feed motion of the parts P and effective resietance against retrograde movement of the parts. The brushes may be omitted and still effect feeding action of parts P, but at the substantial expense of a substantially reduced feed rate and loss of the retrograde motion inhibiting action afforded thereby. The brushes may have a desired forward bristle angle, such as, for instance, 20°–25°, and may take any conventional form, such as that sold by 3M Company under the name Brushlon. Brushlon brushes 35 are illustrated and preferred, with bristles 35a secured at an angle along the length of a flexible plastic base 35b. In the preferred embodiment, the base 35b is rigidified by securement as by screws, not shown, to a metal support base 35c for ease of handling and securement to the base plate 22, to which the brush assemblies 35 are suitably secured by screws 37.

The base plate 22 is itself removably rigidly secured to the feed rails 13 by mounting screws 12.

Inner and outer side retainers 53 and 57 and top retainer 55 are likewise rigidly secured to the longitudinally spaced top support bars 61 through the medium of securing screws 53a, 57a and 55a, respectively, with the top retainer 55 being further rigidified by being fitted within a bottom slot 61c formed in each of the top support bars 61.

The hinged top segment 51 of the feeder section 11 is releasably resiliently effectively locked or clamped in closed position, as shown in FIG. 2, by easily manually operable quick-release/lock over-center latches or clamps 41, each of which releasably engages a respective hook catch 75 formed on the end of a respective one of the hinged top support bars 61. Various latch or clamp constructions may be employed, the illustrated and preferred latch or clamp form having a latch bar or hasp 43 resiliently connected to tension spring 45 secured to a main body which is pivotally mounted on a respective securing block 31, with an over-center locking and release action of the latch as illustratively shown in FIGS. 2 and 3. As the construction and action of such over-center latches is itself well known, such will not be further described in detail. By suitable selection of latch location and type, a desired resilient locking force may be exerted at the free end of the top segment 51, which force will, by leverage action, be effectively magnified at the hinge pivot axis to effect zero lash at the hinge connection, as well as in various other separable stack-up contacting feed-path-forming parts of the feeder, as will be subsequently further described in more detail.

The hinges 81 are each formed by a pin 83 press-fit into aligned horizontal bores formed in the upstanding bifurcate arms of bifurcated hinge blocks 85, and by a pin-engaging half-circle bearing surface 65 formed in an angled cam entry surface 63 formed at the hinged end of each of the hinged top support bars 61, in conjunction with a leaf spring hinge pin retainer 69 secured as by securing screws 53a, 55a and retainer plates 71 to each of the respective hinged top support bars 61.

In the open laid-back position of the hinged top segment 51, it will be noted that the hinges 81 may be easily disjoined by pulling on the top segment 51 in a direction away from the pivot pins 83, as the leaf spring hinge pin retainers 69 will simply yield and permit the pins to be freed from their captive position between the respective leaf spring hinge pin retainers 69 and half-circle bearing surface 65. Likewise, the top segment 51 may be readily and easily replaced by the opposite action of pressing the angled cam entry surfaces 63 and associated facing leaf spring pin retainers 69 against the pivot pins 83 to thereby snap the top segment 51 into freely hinged connection at hinges 81, with the bottom segment 21.

Each of the bifurcated hinge blocks 85 has a horizontal connecting surface 87 at the bottom of the space formed between the upstanding bifurcate arms 85a, each of which surfaces 87 forms an interference surface engageable in levered stack-up height interference fit with a lower rear surface 61b of the respective hinged top support bar 61 when the hinged top segment is in its effectively closed locked-down position as shown in FIGS. 1, 2 and 7B. An initial interference fit before first closure of the hinged top segment may provide an interference or overlap fit between surfaces 87 and 61b of, for example, approximately 0.002 inch, which will result in the top segment 51 resting in a quiescent position at a low inclined angle to the bottom segment 21, with the hinged top support bars 61 resting against the interference surface 85 in the zone of the intersection of the lower rear interference surface 61b and the convex rear bottom end of the hinged top support bar 61. By engaging the latch bar or hasp 43 of each of the latches 41 with the respective hook catch 75 on the outer end of each of the hinged support bars 61 and closing the securing latches or clamps 41 by pressing the over-center pivoted handles 47 down to their over-center self-locking positions as shown in FIGS. 1, 2 and 7B, the leverage advantage afforded by the different greater lever arm length at the point of application of the closure force exerted by the latch or clamp 41 at the outer hook catch 75 end of the hinged top support bars 61 relative to the lever arm length between the pivot axis of the hinge 81 and the zone of resistance formed by the area of stack-up interference contact between support bar surface 61b and hinge support block surface 87 is such that an inexpensive conventional over-center latch or clamp 41 may be readily employed to effect closure of the top segment 51, with resulting stack-up interference mating of the interfacing interference surfaces 61b and 87 of each of the hinged top retainer bars 61 and associated bifurcated hinge blocks 85. As a schematic aid to ready visual appreciation of this interference fit of surfaces 61b and 87, in the closed position of top segment 51, the surface 87 is shown both in full line as it exists after closure, and in phantom in an exaggerated position above the surface 61b on the top support bar as it exists before closure, although it will be appreciated that in fact only a very small initial interference overlap is necessary and, in fact, utilized (e.g., approximately 0.001 to 0.002 inch) in order to achieve the desired interferences at the closed locked-down position of the top segment 51.

By way of example, with a hinged top support bar 61 of six inches from the hinge pivot axis to hook catch 75 and a distance of approximately one-half inch from the hinge pivot axis to the surfaces 61b, a mechanical advantage of approximately twelve to one is afforded, whereby a fifty-pound closure force at hook catch 75 will effect an angular closing force of approximately 600 pounds at the interference surfaces 61b and 87. This is quite adequate to easily wedge the two surfaces together in stack-up interference, and by utilizing a relatively easily swageable material, such as aluminum, for the hinge blocks 85 and a relatively highly wear-resistant material of relatively very low malleability and compressibility, such as tool steel bar stock, for the hinged top support bars 61, it will be appreciated that, after the first several closures, the initial substantial interference fit of from, for example, approximately 0.001 to 0.002 inch, may be reduced by swageing action of the interference surface 87 to an effective interference fit of, for example, of the order of a few ten-thousandths of an inch, e.g., 0.0001 to 0.0002 inch. Of course, the parts could have been initially machined to such a closer initial tolerance with similar end results of an easily fully locked-down and releasable interference fit between interference surfaces 61b of hinge top support bars 61 and the respective interferences 87 of the respective hinge support blocks 85. However, for ease and economy of manufacture, it is substantially more desirable and cost-effective to employ the larger initial interference fit and achieve a closer lesser interference fit by swageing action in course of hinge closures and opening actions during initial use. After initial closure use the swageing action thereafter will be reduced to the point of being effectively immaterial for a relatively long period of feeder use, and for all intents and purposes may be considered minimal, this being due to the swageing action being a function of the degree of interference overlap and the normal force exerted at the point of interference, both of which are reduced by the swageing actions during initial closure and opening actions, with the normal force acting at the point of swageing being very materially decreased thereby, thus enabling as multiple type reduction in subsequent swageing reduction of the interference fit after the interference reaches the lower order of magnitude of, for example, approximately 0.0001–0.0002 inch. Of course, any two sliding mating parts will eventually wear to the point where replacement is necessary.

By effecting the levered stack-up interferences fit between the top support bars 61 and their respective hinge support blocks 85 at surfaces 61b and 87 respectively, it will be appreciated that the half-circle bearing surface 65 will each be tightly jammed against its respective hinge pin 83 and effectively held against the pin 83 during vibratory feeding motion of the feeder section 11, thereby effecting a zero lash hinge connection in the closed portion of the hinged top segment 51 with the bottom segment 21. The levered interference fit afforded by the interference surfaces 61b and 87 on hinged top support bars 61 and bifurcated hinge blocks 85 is thus effective to afford a desired zero lash closed hinge condition for effective minimizing of vibratory wear at the hinge zone.

As an aid to further assurance of a zero lash hinge condition in the closed position of hinged top segment 51, the preferred embodiment of the feeder section as shown in FIGS. 1–3, 7A and 7B, also provides for levered stack-up interference fit between the inner and outer side retainers 53, 57 and their respective bottom retainers 23, 27. To this end, in this preferred embodiment, the combined stack-up height of the inner side retainer 53, inner bottom retainer 23 and stand-off 23b is greater than the corresponding vertical distance between the bottom of the hinged top support bars and the upper surface of bottom plate 22 in the effectively closed position of the top and bottom segments 21, 51 of this preferred feeder section 11 embodiment. Effective interference can be accomplished with relatively small stack-up height differences, for instance of the order of a few thousandths of an inch or less. The resulting levered stack-up interference mating at the interfaces of inner bottom retainer 23 and inner side retainer 53, and outer bottom retainer 27 and outer side retainer 57 will also effect a resultant upward levered engaging action of the half-circle bearing surfaces 65 against their respective pivot pins 83 to thereby assure a zero lash hinge pin/bearing surface engagement if the interference surfaces 61b and 87 should be worn to a free state or if such should even initially be formed without interference fit therebetween.

It will be apparent that, if so desired, a levered zero lash hinge pivot/bearing condition may be effected by employing stack-up interference between only one, instead of both, of the interface-engaging side retainers 53, 57 and their respective bottom retainers 23, 27, in which event the more desirable such single stack-up interference zero-lash-hinge-effecting arrangement would be a stack-up interference between the inner bottom retainer 23 and the inner side retainer 53, due to the more advantageous multiplying lever arm zero-lash-force-effecting action afforded thereby at the interface between the pivot pin 83 and the pivot bearing surface 65, as compared to the fractional lever arm zero-lash-force-effecting action at the hinge pin/bearing interface with only a stack-up height interference formed between the outer side retainer 57 and outer bottom retainer 27 and associated stand-off 27b, which would require a greater closing force on the hook catch 75 to effect the same zero-lash levered force pin 83/pin bearing surface 65 interface.

Bending forces on the bottom plate 22 and the hinged top support bars 61 which result from the levered zero-lash-hinge-effecting stack-up interference action may be taken up by a combination of elastic extension of the latch springs 45, and elastic flexing of primarily the bottom plate 22 and to a very minor and insignificant extent by elastically flexing the more rigid hinged top support bars 61, due to the relatively substantially lesser resistance to flexing by the aluminum bottom plate 22 as compared to the vertically thicker tool steel bar stock forming the hinged top suppport bars 61.

The hinge blocks 85 each have a rear cut-out recess 89 formed therein extending below the bifurcate arms 85a to accommodate the extended end 69a of the leaf spring hinge pin retainer 69 in the laid back opened position of the hinged top segment 51. The vertical wall 91 of the recess 89 forms a shoulder stop for the leaf spring hinge pin retainer extension 69a, which may be suitably bent to enable the hinged top segment to be tilted back past vertical to a stable condition. Bending of the leaf spring end 69a also aids in enabling ease of connection of the removable hinged top segment 51 with the bottom segment through guided snap-on action by the effectively outwardly flared surfaces formed by inclined cam entry surface 63 and bent end 69a of leaf spring hinge pin retainer 69.

To assure the desired levered interference zero-lash-effecting action, the connecting bottom surface 31c between the bifurcate arms 31b of each of the securing blocks 31 is spaced below the facing lower surface of each of the respective top support bars 61. This space is exaggerated in the drawings for ease of visualization, and may be relatively small in actual practice.

As an aid to preventing hang-ups or jamming of parts P at the transition zone between adjoining ones of the replaceable modular feeder sections 11, and to aid in smooth feed into the first such feeder in a feed line, the entrance end of the middle bottom retainer 25 is beveled as shown at 25a.

As a further aid in preventing catching and lock-up or jamming of parts P at the transition zone between the removable modular feed sections 11, the top retainer 55 is longitudinally forwardly offset to thereby provide an offset connection or transition zone between the successive top retainers 55 relative to the connection or transition zone between successive bottom retainers 23, 25, 27, as seen in FIG. 1, with a forwardly offset entrance end 55c and a forwardly extended extension end 55b of the top retainer 55.

Additionally, as a further aid in preventing lock-ups of parts, particularly tail-to-tail lock-ups of tailed parts such as are often present on flat blank parts such as rocker arm blanks, the inner and outer bottom retainers are each beveled along their upper longitudinal surface as indicated at 23a and 27a, respectively.

The lateral width of the guided feed path FP formed by the retainers 23, 25, 27, 53, 55 and 57, may suitably be somewhat wider than a single part P, but substantially less than the width of two parts P, being fed therethrough, and the height of the feed path FP as formed between bottom retainers 23, 25, 27 and top retainer 55 may also be suitably greater than the thickness or height of a single part P being fed therethrough, but substantially less than the combined height of two parts P being fed at any given time (e.g., a feed path height of approximately one and one-half times the thickness of the parts is generally satisfactory). This will facilitate an effective single file vibratory feeding action along the feed path FP.

In the illustrative preferred embodiment having horizontal inner and outer bottom retainers 23, 27, it is a simple matter to change the width of the guided feed path FP, simply by changing the widthwise spacing between inner and outer side retainers 53, 57. Likewise, the height of the guided feed path FP is also easily changed simply by changing the height of top retainer 55. Both of these changes may be simply and quickly accomplished by the simple expedient of removal and replacement of one hinged top segment 51 with another hinged top segment having the desired lateral spacing between its inner and outer retainers 53, 57 providing the desired vertical spacing between its top retainer 55 and the facing bottom retainers 23, 25, 27. Thus, a complete changeover of a feed line for accommodating a different part size can be simply and quickly accomplished by the quick and simple expedient of removal and replacement of the quick release hinged top segments 51, without need for removal or replacement of the modular bottom segments 21 unless the part size exceeds the feed path width change which may be accommodated by the width of the horizontal inner and outer bottom retainers 23, 27 of a given bottom segment 21.

Figure 5:
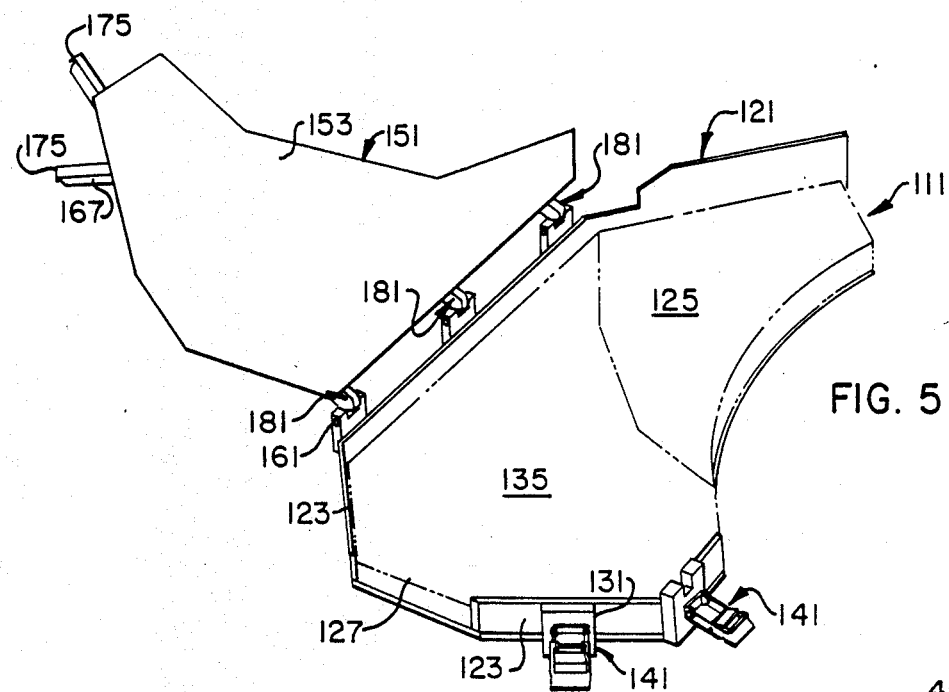
FIG. 5 is a perspective view of a modification according to the invention, as embodied in a singulator-type vibrator feeder, and showing the hinged top in its opened position.
Figure 10:
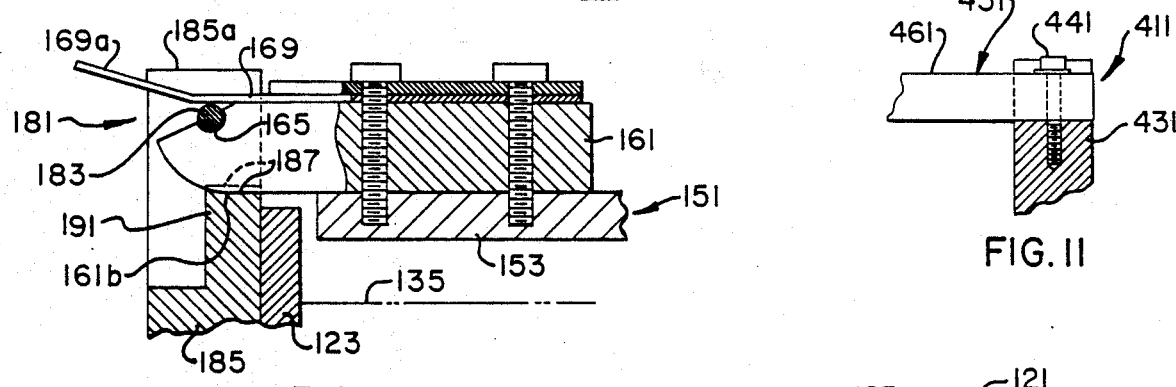
FIG. 10 is a fragmentary section view of one of the hinges of the embodiment of FIGS. 5 and 6, schematically illustrating the stack-up height levered zero lash action at the hinge zone in the closed position of the hinged top segment.
Figure 6:
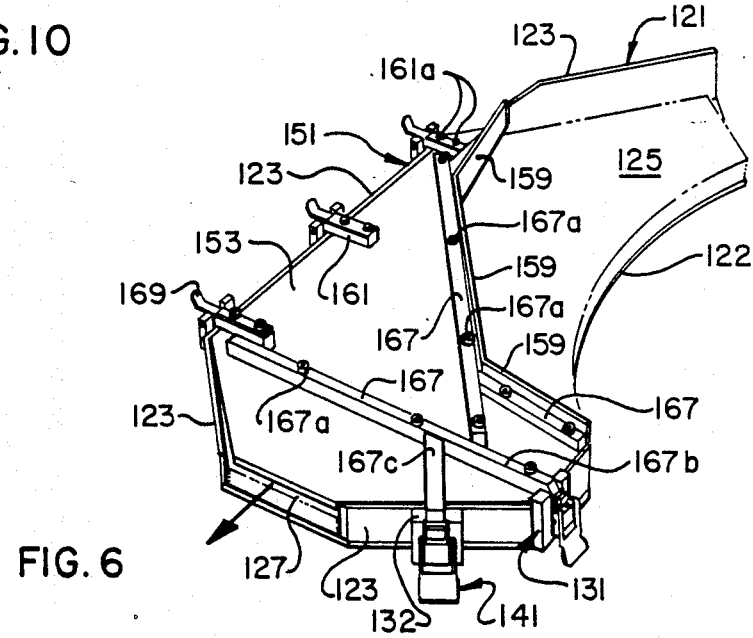
FIG. 6 is a perspective view of the embodiment of FIG. 5, showing the top in releasably locked closed position.

A modified embodiment of a zero-lash-hinged feeder arrangement 111 according to the invention, is illustrated in FIGS. 5, 6 and 10, which embodiment illustrates what is referred to as a singulator. In a singulator a quantity of parts may be fed into one end in a random overlapping and side-by-side piled up assorted relationship arrangement, and are fed therethrough to an exit opening where they emerge in single file. The particular mode of accomplishment of this singulating action does not itself form a part of this invention, and accordingly will not be illustrated or described for operational teaching purposes, as such singulating action construction and operation is itself a matter generally a matter of skill of the art.

The singulator is shown and will be described with respect to the application of the present invention to a singulator-type vibratory feeder.

Figure 4:
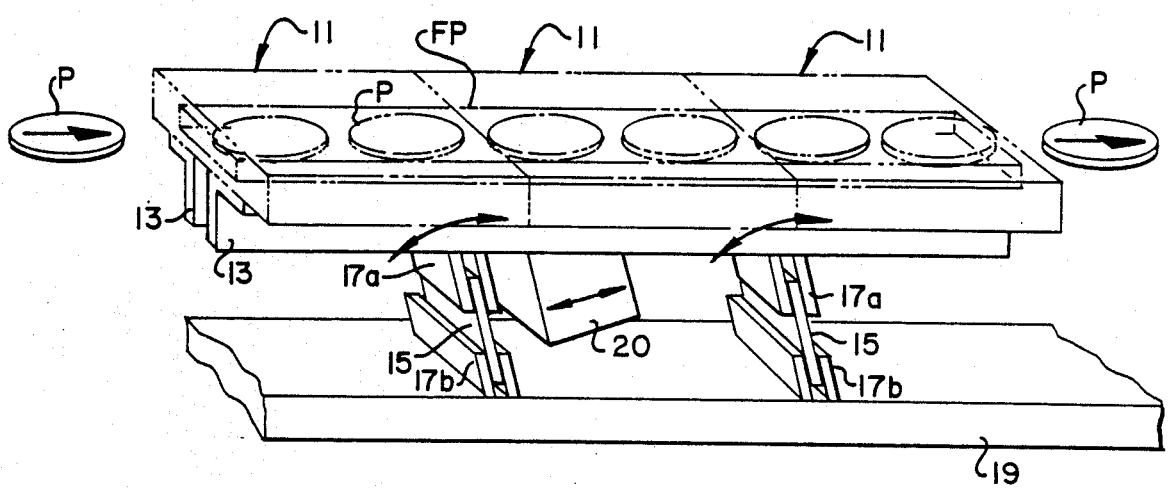
FIG. 4 is a schematic representation of a conventional vibratory feeder motion-imparting arrangement, in which the invention may typically be employed.

In the illustrative singulator 111 of FIGS. 5 and 6, the singulator includes a bottom segment 121 which may be suitably supported on spring-supported feed rails which are reciprocably vibrated to impart toss and catch feeding action as in the embodiments schematically shown in FIG. 4, with the feed action being along feed surface zones 125 and 135 thereof toward the feed exit 127, as shown by the general vibratory exit feed directional arrow in FIG. 6.

In this embodiment of the invention, a zero lash hinge 181 is formed by providing a levered interference stack fit between the rear bottom interference surface 161b of the three hinged top support bars 161 and the horizontal interference surface 187 connecting between the bifurcated arms 185a of each respective hinge block 185, with the hinged top segment 151 being pulled down to its closed position by the downward forces applied thereto through the manually releasable over-center locking of the two over-center latches or clamps 141.

The levered interference zero lash hinge action, whereby the half-circle bearing surface is forcibly levered up and held in engagement with the hinge pin 183, is thus accomplished in this embodiment in the same manner as is accomplished in the first embodiment, without the added presence of the interface vertical stack-up interfering bottom and side retainers such as are provided at 23, 27, 53 and 57 of the embodiment of FIG. 1. In FIG. 10, the interference is again schematically indicated and exaggerated by showing surfaces 161b and 187 with the swaged stack-up interference interface in closed position shown in full horizontal line, and the initial overlapping interference height of the surface 187 of aluminum hinge block 185 shown in exaggeratedly higher position by phantom lines.

The side retainers 123 in this embodiment are simply peripheral wall members suitably rigidly secured to the bottom plate 122 as by securing screws (not shown) and such side retainers do not interface in stock-up interference with any portion of the hinged top segment 151, although such interference may be effected if so desired, as by stack-up interference engagement between the upper surface of side retainer wall 123 and the lower facing surface of each of the hinged upper support bars 161.

The hinged top segment 151 is formed by a flat steel plate with rigidifying tool steel gusset bars 167 rigidly connected thereto along its upper surface by securing screws 167a. As in the previously described embodiment of FIGS. 1–3, 7A and 7B, the top segment may be angularly moved up and down about its hinge connection axis formed by hinge pins 183, the top segment being removable and replaceable as may be desired by snap-off and snap-on disconnection and connection of the hinged top segment with the hinge pin in the same manner as described in the description of FIGS. 1–3. Likewise, the bent ends 169a of leaf spring hinge pins retainers 169 act in conjunction with wall limit stops 191 to permit the top segment to rest in a stable raised position beyond the vertical, for inspection or other desired action.

This singulator feeder embodiment 111 only employs two over-center locking latches or clamps 141 (which are identical to the latches or clamps 41), due to the limitations of geometry of the parts. This has been found to provide satisfactory operation, as may other combinations of hinge and locking latch quantities and positions, as one skilled in the art may determine to be feasible and desirable for a given application of the invention.

It will also be noted that in this singulator feeder embodiment 111, while the hinge block 131 is substantially identical with the hinge blocks 31 having a bifurcated upper end, due to the canted mounting of the hinge block 132 on the angled side retainer 124 to which it is secured, the top surface of this hinge block 132 is flat and unencumbered, so as to enable the protruding end of the short top segment gusset bar 167c having a hook catch 175 formed thereon to be pulled down to locked closed position without interference which could be encountered with a bifurcated top on the securing block 132.

As noted, the other hinge block 131 may be suitably identical in construction and operation to hinge blocks 31 of the embodiment of FIGS. 1–3, with latches or clamps 141 likewise identical to latches or clamps 41.

In the singulator, the top retainer 151 is formed by the gusset-reinforced top plate 155, which extends across the feed zone indicated at 135 in FIG. 5 when in the closed operational position. The side retainers are, as previously noted, formed by the side retainer walls 123 of the bottom segment 121, and the bottom retainers, not shown, may be suitably arranged at desired locations and with desired directions and spacing within the zone indicated at 135, as one skilled in the art may find desirable, to provide a single layer parts feed zone across the zone 135 effectively generally directed toward the exit feed opening 127, for exit feed of single parts P for further feeding, such as to a feeder section 11, and/or for processing or handling as may be desired.

The entrance apron area 125 may suitably be generally covered with angle-oriented brushes as by mounting of sections of brushes in desired bristle angle orientation, to permit the general feeding of the parts toward the generally concave transition zone between entrance zones 125 and 135 with overflow of parts being inhibited by the higher side retainer walls 123 in this area and the overflow-inhibiting wall 159 extending up above the top plate 153 along the generally concave transition zone to the top covered feed area 135. In this entrance zone 125, one may, if desired, provide only a brush support for the parts P, which are random in stacked height and lateral quantity and positioning, while the singulating feed zone 135 extending below the top retainer 125, suitable bottom retainers may be provided, as one skilled in the art may so desire, to effect, in conjunction with suitably arranged and angled brushes, a single layer feed path which converges and feed the parts in single file to and through the feed exit 127. As previously noted, this singulator embodiment is only illustrated as applying the present zero lash hinged feeder invention, and is not intended to be a teaching of the details of parts feeding in a singulator, as such singulator parts feeding does not form a part of the invention nor is the application of the invention to singulators dependent upon the particular parts feeding and singulating action. Accordingly, the particular components and the placement and orientation thereof in the feed zones 125 and 135 is not illustrated or specifically described herein.

Figure 8A:
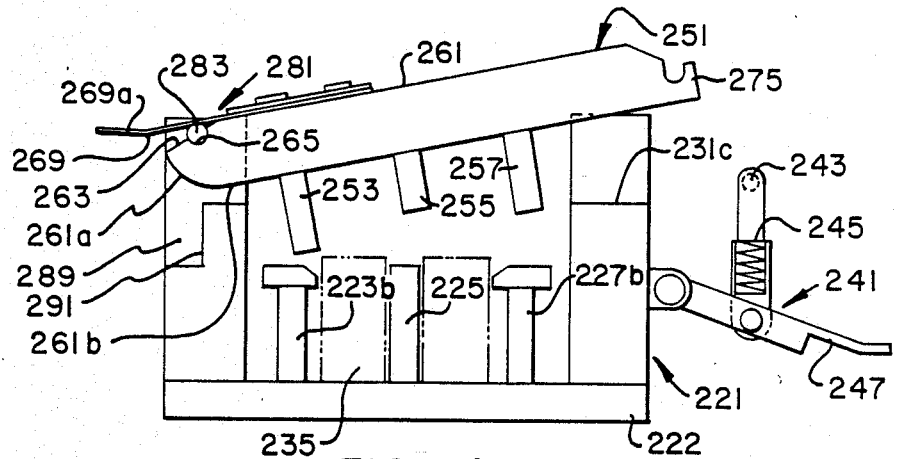
Figure 8B:
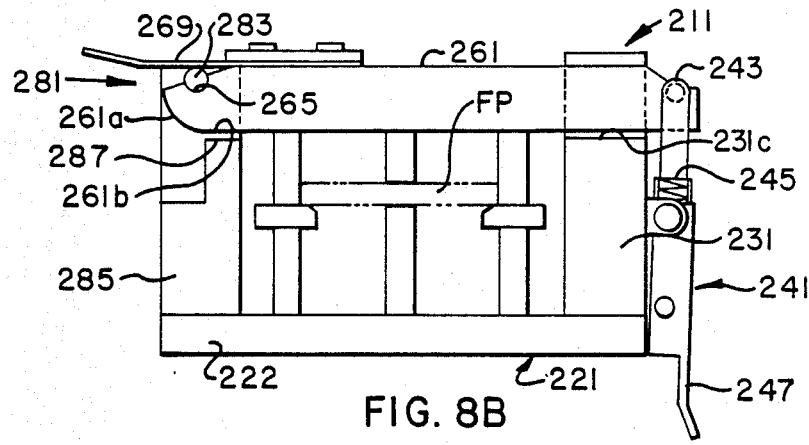

A further modification of the invention is illustrated in FIGS. 8A and 8B, which modification has been previously alluded to in the description of the embodiment of FIGS. 1-3, 7A and 7B. In this embodiment, the hinge 281 is formed with a clearance between the bottom surfaces 261b and the hinge block surface 287 when the top segment 251 is in the releasably locked closed portion by the closure force exerted by the manually operable quick-release over-center latch or clamp 241 acting on the associated hook catches 275 of the top support bars 261 which carry the inner and outer side retainer 253, 257 and the top retainer 255.

In this modification, the levered zero lash force acting at the junction of hinge pin 283 and half-circle hinge-bearing surface 265 is effected by stack-up height interference between one or preferably both of the inner and outer side retainers 253 and 257 and their respectively interface mating inner and outer bottom retainers 223 and 227 when the top segment 251 is in the closed latched locked position. This stack-up height interference effects a levered upward force on the hinge pin 283 at the half-circle bearing surface 265, the amount of which will be dependent upon the relative lever arm lengths on opposite sides of the stack-up height interference forming lever fulcrums (or fulcrums if both inner and outer side retainers are in stack height interference with their respective bottom retainers 223 and 227), and the downward force exerted on the hook catch 275 by the closed over-center latch or clamp 241.

Figure 9A:
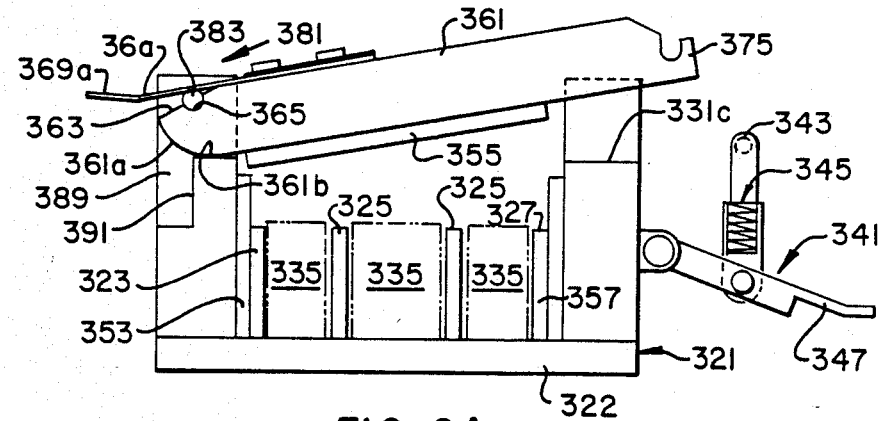
Figure 9B:
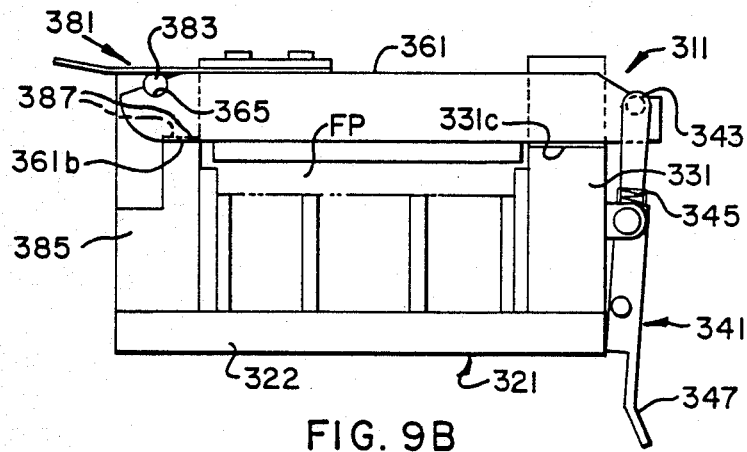

Another modification is illustrated in FIGS. 9A and 9B, in which the levered zero latch force action is effected by a stack-up height interference formed beneath the hinge pin, effected by interference overlap between the rear bottom surface 361b on each of the top support bars 261 and the facing connecting surface 387 between the bifurcate hinge-pin-support arms on the hinge pin 381, with resulting stack-up interference therebetween when the hinged top segment is in the closed latch locked position as shown in FIG. 9A.

This form of levered zero lash action at the hinge pivot/half-circle bearing interface is employed in this embodiment, as the top segment 351 has a flat plate 355 forming a top retainer and which does not vertically engage with the side retainers which are formed by side walls 353, 357 which are themselves suitably rigidly secured to the base plate 322 of bottom segment 321. Likewise, there is no engagement of the top retainer plate 355 with the bottom retainers which are formed by upstanding longitudinal bars 325, 325, 325, 327 and between which are secured inclined bristle brushes 335, 335, 335.

It will be appreciated, as has been previously discussed in the description of the embodiments of FIGS. 1-3, 7A and 7B and the embodiment of FIGS. 5, 6 and 10, that the levered zero lash force is exerted at the hinge pin 383/half-circle bearing 365 interface as a function of the stack-up height interference effected between the top support bars 361 and the respective bifurcated hinge blocks 385 at the zone of contact between the rear bottom surface 361b of each top support bar 361 and the upwardly facing surfaces 387 frictionally engages thereby on the respective hinge block 385 therefor.

The cross-section of the feed path FP formed by this feeder embodiment 311 is shown in phantom lines at FP in FIG. 9B, as the feed path FP is similarly shown in FIGS. 7B and 8B for the respective embodiments shown thereby.

Figure 11:
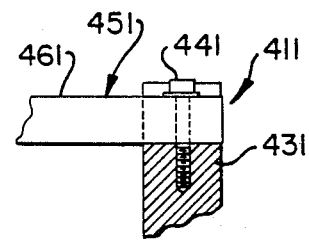
FIG. 11 illustrates a substantially less desirable but marginally usable alternate mode of locking the hinged top and bottom sections together through use of a securing screw, in lieu of the manually operable releasable over-center clamp or latch of the preceding and more preferred embodiments.

In all of the preceding described embodiments, and in all preferred embodiments, a quick-release lock or latch, in the form of an over-center latch or clamp 41, 141, etc., is employed for ease and simplicity of operation as well as affording substantial savings of time and labor expense in top segment opening, removal and servicing. However, it is also feasible, though ordinarily not desirable, to substitute a securing screw arrangement for securing the levered zero-lash hinged top segment in place. Such a screw-securing embodiment 411 is illustrated in FIG. 11, in which the top support bars 451 are each releasably secured at their outer free end by a securing screw 441 threadedly engaging its respective securing block 431. While this screw-securing arrangement will enable the accomplishment of levered zero lash at the hinge pivot pin/bearing interface as in the preceding described embodiments, it will be apparent that such is not recommended for practical commercial use in view of the relatively cumbersome and time-consuming aspects associated with its use.

The invention has been illustrated and described with respect to several illustrative embodiments and modifications. Various other modifications and improvements will become apparent to one skilled in the art from the Drawings and a reading of the description and Claims. For instance, while again of only rudimentary value as compared to the illustrated and highly more preferred forms of practice of the invention, if one should so desire, the levered zero-lash hinge vibratory feeder aspect of the invention may be applied vibratory feeders with a nonremovable hinged top, or with a more conventionally removable hinged top. Also, while multiple hinge and multiple latch embodiments have been described, and are preferred, the invention may be embodied in a vibratory feeder with a single hinge and/or a single closure latch. Accordingly, the invention is not to be limited by the particular illustrative embodiments, but only by the scope of the appended Claims.

I claim:

1. A vibratory feeder for use in a vibratory conveyor having a means to impart vibratory feed motion, said vibratory feeder comprising:
   jointly vibratable top and bottom segments which together form a feed zone for parts to be fed therethrough,
   said top and bottom segments being hinged together through a hinge connection therebetween,
   force-applying closure-securing means for applying a closure force and securing action at a position spaced from said hinge connection to effect secured effective closure of said top and bottom segments together for vibratory feeding operation thereby, and zero-lash-effecting means for effecting a zero lash in the hinge connection in the effectively closed position of said hinged together and bottom segments as a function of hinged angular relative closure movement thereof together.

2. A feeder arrangement according to claim 1, and means for imparting vibratory feed motion to said jointly vibratable top and bottom segments.

3. A feeder according to claim 1, said zero-lash-effecting means including said hinge connection.

4. A vibratory feeder for use in a vibratory conveyor having a means to impart vibratory feed motion, said vibratory feeder comprising:

jointly vibratable top and bottom segments which together form a feed zone for parts to be fed therethrough.

said top and bottom segments being hinged together through a hinge connection therebetween, force-applying closure-securing means for applying a closure force and securing action at a position spaced from said hinge connection to effect secured effective closure of said top and bottom segments together for vibratory feeding operation thereby, and zero-lash-effecting means for effecting a zero lash in the hinge connection in the effectively close position of said hinged together top and bottom segments and as a function of hinged relative closure movement thereof together, said hinge having pivot means forming a hinge pivot axis, said zero-lash-effecting means comprising stack-up height interference means spaced from said hinge pivot axis, hinged closure of said top and bottom segments effecting a zero lash condition at said hinge pivot means as a function of levered action applied at said stack-up interference means effected through said hinged closure of said top and bottom segments.

5. A feeder according to claim 4, said zero-lash condition at said hinge pivot means being effected by application of a levered zero-lash-effecting force at said pivot means as a function of levered closure of said bottom and top segments.

6. A feeder according to claim 5, said hinge pivot means comprising a hinge pin secured in one of said hinged top and bottom segments, and a corresponding hinge-pin-engaging bearing surface on the other of said hinged top and bottom segments, said zero-lash-effecting force being applied and acting at the interface between said hinge pin and said hinge-pin-engaging bearing surface to thereby effectively maintain said hinge pin and hinge-pin-engaging bearing surface in engagement during vibratory action of said hinged top and bottom segments.

7. A feeder according to claim 6, said force-applying closure-securing means being disposed adjacent the respectively relatively free ends of said hinged top and bottom segments to enable application of a closure-securing force adjacent said free ends of said hinged top and bottom segments, said stack-up height interference being effected as a levered sliding stack-up interference fit of parts of said top and bottom segments at said hinge connection.

8. A feeder according to claim 7, said hinge connection further comprising a hinge block on one of said top and bottom segments and having said hinge pin therein, said hinge-pin-engaging bearing means being disposed on the other of said top and bottom segments.

9. A feeder according to claim 8, said bottom segment being rigidly fixed in place, and said top segment being hingedly angularly movable about said hinge connection, said zero-lash-effecting force being a levered force applied at said hinge through said top segment, in a direction opposite the direction of closure force on said top segment by said force-applying securing means.

10. A feeder according to claim 2, said force-applying closure-securng means acting to apply a closure-securing force on said top segment adjacent the hinged free end of said top segment, said stack-up height interference being effected by a stack-up interference formed between said top and bottom segments at a position spaced laterally from the hinge axis zone of said hinged connection.

11. A feeder according to claim 10, said stack-up interference location being disposed between said hinge axis and the zone of application of said closure-securing force on said top segment.

12. A feeder according to claim 2, one of said top and bottom segments having at least one side retainer for lateral retention of parts during feeding of parts between said top and bottom segments, said stack-up interference being formed by and between said side retainer and a portion of the other of said top and bottom segments and which interfaces in stack-up interference-abutting relation with said one side retainer in the secured closed position of said hinged top and bottom segments.

13. A feeder according to claim 12, said one top or bottom segment having a second side retainer thereon spaced laterally from said one side retainer and extending toward the other one of said hinged top and bottom segments, both of said side retainers being in abutting stack-up interference with a respective interfacing portion of said other one of said hinged top and bottom segments in the secured closed position of said hinged top and bottom segments.

14. A feeder according to claim 13, said top segment having both of said side retainers thereon and extending downward toward said bottom segment in the closed position of said hinged top and bottom segments.

15. A feeder according to claim 14, said hinged top segment having a top retainer for vertical guiding of parts to be fed within said feeder, said top retainer being disposed between said side retainers.

16. A feeder according to claim 15, said side and top retainers comprising bars extending longitudinally along the direction of feed of parts between said hinged top and bottom segments.

17. A feeder according to claim 12,
and inner and outer bottom retainers on said bottom segment and interfacing with side retainers in stack-up height interference.

18. A feeder according to claim 17,
said inner and outer bottom retainers being wider than side retainers.

19. A feeder according to claim 18,
and a further bottom retainer on said bottom segment and disposed between said two inner and outer bottom retainers.

20. A feeder according to claim 19,
and inclined bristle brush means on said bottom segment and disposed between the adjacent ones of each of said bottom retainers.

21. A feeder according to claim 20,
said further bottom retainer having a cam-edged entrance end.

22. A feeder arrangement according to claim 21,
said cam-edged entrance end being formed by a beveled upper entrance end edge thereon.

23. A feeder according to claim 21,
said inner and outer bottom retainers each having an inclined cam surface on one edge thereof.

24. A feeder arrangement according to claim 23,
each of said inner and outer bottom retainers having a beveled longitudinal edge formed thereon and forming the respective said inclined cam surface.

25. A feeder arrangement according to claim 20,
said brush means comprising longitudinally extending brush assemblies removably secured between said two inner and outer bottom retainers.

26. A feeder according to claim 4,
said stack-up height interference means forming a zero-lash-enabling lever fulcrum between said top and bottom segments.

27. A vibratory feeder for use in a vibratory conveyor having a means to impart vibratory feed motion, said vibratory feeder comprising:
jointly vibratable top and bottom segments which together form a feed zone for parts to be fed therethrough,
said top and bottom segments being hinged together through a hinge connection therebetween,
force-applying closure-securing means for applying a closure force and securing action at a position spaced from said hinge connection to effect secured effective closure of said top and bottom segments together for vibratory feeding operation thereby,
and zero-lash-effecting means for effecting a zero lash in the hinge connection in the effectively closed position of said hinged together top and bottom segments as a function of hinged angular relative closure movement thereof together,
said hinge having pivot means forming a hinge pivot axis, said zero-lash-effecting means comprising stack-up height interference means spaced from said hinged pivot axis, hinged closure of said top and bottom segments effecting a zero lash condition at said hinge pivot means as a function of levered action applied to said stack-up interference means effected through said hinged closure of said top and bottom segments, said force-applying closure-securing means being disposed adjacent the respectively relatively free ends of said hinged top and bottom segments to enable application of a closure-securing force adjacent said free ends of said hinges top and bottom segments,
said stack-up height interference being effected as a levered sliding stack-up interference fit of parts of said top and bottom segments at said hinge connection.

28. A feeder arrangement according to claim 27,
said force-applying closure-securing means being disposed adjacent the respective free ends of said hinged top and bottom segments.

29. A feeder arrangement according to claim 28,
said force-applying closure-securing means comprising a plurality of spaced apart individual closure-securing locks.

30. A feeder arrangement according to claim 29,
each of said force-applying closure-securing locks comprising an over-center resiliently-acting latch or clamp affording a mechanical advantage multiplied resiliently-acting holding force relative to the manual over-center force required to close said over-center latch.

31. A feeder arrangement according to claim 28,
said top segment including a plurality of spaced-apart hinged top support bars,
said force-applying closure-securing means being disposed adjacent the free end of one of said hinged top bars.

32. A feeder arrangement according to claim 31,
said force-applying closure means being disposed adjacent the respective free end of a plurality of said hinged top support bars.

33. A vibratory feeder for use in a vibratory conveyor having a means to impart vibratory feed motion, said vibratory feeder comprising:
jointly vibratable top and bottom segments which together form a feed zone for parts to be fed therethrough,
said top and bottom segments being hinged together through a hinge connection therebetween,
force-applying closure-securing means for applying a closure force and securing action at a position spaced from said hinge connection to effect secured effective closure of said top and bottom segments together for vibratory feeding operation thereby,
and zero-lash-effecting means for effecting a zero lash in the hinge connection in the effectively closed position of said hinged together top and bottom segments as a function of hinged angular relative closure movement thereof together,
said hinge having pivot means forming a hinge pivot axis, said zero-lash-effecting means spaced from said hinge pivot axis, hinged closure of said top and bottom segments effecting a zero-lash condition at said hinge pivot means as a function of levered action effected through said hinged closure of said top and bottom segments, said zero-lash condition at said hinge pivot means being effected by application of a levered zero-lash-effecting force at said pivot means as a function of levered closure of said bottom and top segments,
said bottom segment being rigidly fixed in place, and said top segment being hingedly angularly movable about said hinge connection, said zero-lash-effecting force being a levered force applied at said hinge through said top segment, in a direction opposite the direction of closure force on said top segment by said force-applying securing means.

34. A vibratory feeder for use in a vibratory conveyor having a means to impart vibratory feed motion, said vibratory feeder comprising:
jointly vibratable top and bottom segments which together form a feed zone for parts to be fed therethrough,
said top and bottom segments being hinged together through a plurality of substantially coaxially aligned hinged connections therebetween
force-applying closure-securing means for applying a closure force and securing action at a position spaced from said hinge connection to effect secured effective closure of said top and bottom segments together for vibratory feeding operation thereby,
and zero-lash-effecting means for effecting a zero lash in each of said hinge connections in the effectively closed position of said hinged together top and bottom segments as a function of hinged angular relative closure movement thereof together.

35. A vibratory feeder arrangement for use in a vibratory conveyor having a means to impart vibratory feed motion, said vibratory feeder arrangement comprising:
jointly vibratable top and bottom feed-path-forming segments hinged together through a hinge connection therebetween along a side of said segments, and forming a pivot axis for opening and closing of said segments relative to one another,
said hinge being forced into and held in zero-lash condition as a function of angular relative movement of said top and bottom feed-path-forming segments about said hinge connection and into closed feed-path-forming position relative to one another.

36. An arrangement according to claim 35,
further comprising force-effecting means acting to effect opposing zero-lash effecting forces at said hinge connection as a function of relative closing movement of said top and bottom feed-path-forming segments toward one another.

37. A vibratory feeder arrangement for use in a vibratory conveyor having a means to impart vibratory feed motion, said vibratory feeder arrangement comprising:
jointly vibratable top and bottom feed-path-forming segments hinged together through a hinge connection therebetween along a side of said segments, and forming a pivot axis for opening and closing of said segments relative to one another,
said hinge being forced into and held in zero-lash condition as a function of angular relative movement of said top and bottom feed-path-forming segments about said hinge connection and into closed feed-path-forming position relative to one another,
force-effecting means acting to effect opposing zero-lash-effecting forces at said hinge connection as a function of relative closing movement of said top and bottom feed-path-forming segments toward one another,
said force-effecting means comprising intermating interference surfaces on respectively said top and bottom segments and forming a lever fulcrum between said pivot axis and the opposite side of each of said bottom and said top feed-path-forming segments, whereby closure action forces exerted on said opposite sides of said top and bottom feed-path-forming segments will effect a levered anti-lash action on said hinge and thereby effect a zero-lash condition in said hinge.

38. An arrangement according to claim 37,
said intermating interference surfaces being out of engagement when said top and bottom feed-path-forming-segments are relatively angularly moved apart to an effectively fully opened position.

39. An arrangement according to claim 37,
said intermating interference surface being formed by interference surfaces on said top feed-path-forming segment and a hinge support member on said bottom feed-path-forming segment and which are brought into increasing wedging stack-up interference contact as a function relative angular closure movement of said top and bottom feed-path-forming segments.

40. An arrangement according to claim 37,
said intermating interference surfaces being formed by interference surfaces spaced between said pivot axis and the opposite lateral side of each of said top and bottom feed-path-forming segments,
at least one of said feed-path-forming segments having a feed-path-forming element defining a boundary for a feed path within said top and bottom feed-path-forming segments and forming one of said interference surfaces.

41. An arrangement according to claim 40,
each of said feed-path-forming segments having a feed-path-forming element defining a boundary for a feed path within said top and bottom feed-path-forming segments and forming respectively said intermating interference surfaces.

42. An arrangement according to claim 37,
said intermating interference surfaces being formed by stack-up interference surfaces on said top feed-path-forming segment and a hinge support member on said bottom feed-path-forming segment, and which stack-up interference surfaces are brought into increasing wedging contact as a function of relative angular closure movement of said top and bottom feed-path-forming segments.

43. An arrangement according to claim 37,
said intermating interference surfaces being formed by stack-up interference surfaces spaced between said pivot axis and the opposite lateral sides of each of said top and bottom feed-path-forming segments.

44. An arrangement according to claim 37,
at least one of said feed-path-forming segments having a feed-path-boundary-forming-element defining a boundary for a feed path within said top and bottom feed-path-forming segments and forming one of said stack-up interference surfaces.

45. An arrangement according to claim 37,
said intermating interference surfaces being formed by stack-up interference surfaces on said top feed-path-forming segment and a hinge support member on said bottom feed-path-forming segment and which are brought into increasing wedging contact as a function of relative angular closure movement of said top and bottom feed-path-forming segments,
said intermating stack-up interference surfaces being disposed in spaced relation between said pivot axis and the opposite lateral sides of each of said top and bottom feed-path-forming segments, each of said feed-path-forming segments having a feed-path-boundary-forming element defining a boundary for a feed path within said top and bottom feed-path-forming segments and forming respectively said intermating stack-up interference surfaces.

46. An arrangement according to claim 37, said intermating interference surfaces being formed by stack-up interference surfaces spaced between said pivot axis and the opposite lateral sides of each of said top and bottom feed-path-forming segments, at least one of said feed-path forming segments having a feed-path-boundary-forming element defining a boundary for a feed path within said top and bottom feed-path-forming segments and forming one of said interference surfaces.

47. An arrangement according to claim 46, further comprising two laterally spaced apart feed-path-forming elements disposed between said hinge and said opposite lateral side of said top and bottom feed-path-forming segments and defining opposite lateral boundaries for a feed path within said hinged top and bottom feed-path-forming segments, and one of said feed-path-boundary-forming elements forming one of said stack-up interference surfaces.

48. An arrangement according to claim 47, each of said laterally spaced apart feed-path-boundary-forming elements being a side retainer and forming an intermating stack-up interference fit with a respective interfacing intermating stack-up interference surface on the other of said top and bottom feed-path-forming segments.

49. A vibratory feeder arrangement for use in a vibratory conveyor having a means to impart vibratory feed motion, said vibratory feeder arrangement comprising:

jointly vibratable bottom and top retainer sections hinged together along one side thereof through a hinge assembly for opening and closure of said bottom and top sections through relative angular movement of said top and bottom sections about a pivot axis formed by said hinge assembly, said hinge means having a hinge pin on one of said top section and said bottom section, and a hinge-pin-engaging bearing surface on the other of said sections, said hinge pin and said bearing surface being angularly movable relative to one another as a function of angular movement of said hinged top section relative to said bottom section in opening and closure of said conveyor section, and means effecting an interengaging zero-lash contact mating force between said hinge pin and said bearing portion as a function of pivoted angular closing movement of said top section about the axis formed by said hinge pin and hinge-pin-engaging bearing surface and toward said bottom assembly, to thereby effect a zero-lash contact hinge connection at said hinge pin and associated interengaged hinge bearing surface when said top assembly is in substantially closed relation with said bottom assembly, and holding means for holding said top section in substantially closed position, whereby said hinge pin and hinge-pin-engaging bearing surface are thereby caused to be in zero-lash-mated relation.

50. A conveyor arrangement according to claim 49, said holding means comprising an over-center-acting quick-release latch or clamp enabling a closure-holding force to be effected on said top segment which is a levered mechanical advantage multiple of the manual over-center closure force required to be manually exerted in moving said latch over center from its unlatched or umclamped position to its latched or clamped position, said over-center-acting latch or clamp also acting to maintain itself in latched or clamped locked condition upon its being moved over-center to its locked condition, with increased self-lock-retention holding action in response to opening forces which may be exerted on said top and bottom segments such as by vibratory feeding action forces which may be applied thereto.

51. A conveyor arrangement according to claim 50, and means for imparting vibratory feeding movement to said bottom and top segments.

* * * * *